US 6,272,259 B1

(12) United States Patent
Mizoguchi (10) Patent No.: US 6,272,259 B1
(45) Date of Patent: Aug. 7, 2001

(54) IMAGE CORRECTING APPARATUS, IMAGE DATA COMPRESSING APPARATUS AND IMAGING APPARATUS

(75) Inventor: Yuji Mizoguchi, Chiba (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/159,672

(22) Filed: Sep. 24, 1998

(30) Foreign Application Priority Data

Sep. 26, 1997 (JP) .................................................. 9-261254

(51) Int. Cl.[7] .............................. G06K 9/36; G06K 9/38; G06K 9/48
(52) U.S. Cl. .......................... 382/251; 382/248; 382/275
(58) Field of Search .................................... 382/251, 248, 382/250, 274, 275, 141, 167

(56) References Cited

U.S. PATENT DOCUMENTS 5,535,013 * 7/1996 Murata .................................. 358/432
5,850,484 * 12/1998 Beretta et al. ........................ 382/250
6,041,144 * 3/2000 Sugiura ................................. 382/239

FOREIGN PATENT DOCUMENTS 6-105241    4/1994  (JP) .

* cited by examiner

Primary Examiner—Phuoc Tran
(74) Attorney, Agent, or Firm—Oliff & Berridge, PLC (57) ABSTRACT

An image correcting apparatus is applied to a compression circuit for processing the compression of image data by subjecting each image data inputted on a block basis to orthogonal transformation, quantizing the image data according to quantization tables and subjecting the image data thus quantized to variable-length encoding and has a switching circuit for switching a first quantization table for use in quantizing image data in a block where an image flaw exists and a second quantization table for use in quantizing image data in a block where no image flaws exist according to flow position information for indicating a position where the image flaw is located. Furthermore, the image correcting apparatus preferably has a flaw detecting circuit for detecting whether the image flaw exists in a block by comparing each coefficient of single image data after orthogonal transformation with each reference coefficient after orthogonal transformation, and a data generating circuit for generating a first quantization table corresponding to the image flaw in the block. Moreover, an image data compressing apparatus has the image correcting apparatus and the compression circuit.

25 Claims, 3 Drawing Sheets

FIG.6
PRIOR ART

IMAGE CORRECTING APPARATUS, IMAGE DATA COMPRESSING APPARATUS AND IMAGING APPARATUS

BACKGROUND OF THE INVENTION

The present invention relates to an image correcting apparatus fit for use in an imaging apparatus such as a digital still camera for processing image data compression, to an image data compressing apparatus using the image correcting apparatus and to an imaging apparatus fitted with the image correcting apparatus and the image data compressing apparatus. More particularly, the present invention relates to an image correcting apparatus for correcting conspicuous fixed image flaws and making them inconspicuous, when image data is compressed, wherein the fixed image flaws are produced in a regenerated image due to scratches on a lens, defective pixels of an imaging device and furthermore dust sticking to the surfaces of the lens and the imaging device, to an image data compressing apparatus using the image correcting apparatus and to an imaging apparatus fitted with the image correcting apparatus and the imaging data compressing apparatus.

Figure 5:
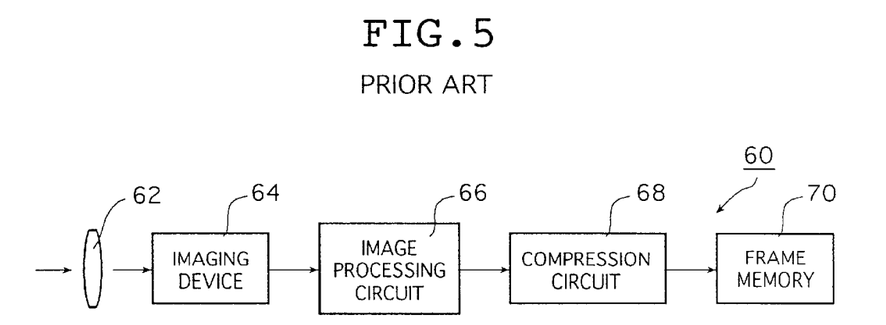
FIG. 5 is a block diagram showing a conventional imaging apparatus.

FIG. 5 is a block diagram showing the configuration of a conventional imaging apparatus by way of example. The exemplary imaging apparatus 60 in FIG. 5 essentially comprises a lens 62, an imaging device 64, an image processing circuit 66, a compression circuit 68 and a frame memory 70. An image formed through the lens 62 and inputted into the imaging device 64 such as CCD is converted into an image signal when subjected by the imaging device 64 to photoelectric conversion, converted by the image processing circuit 66 into a format of such as RGB, which is divided into image data on a block basis, encoded and compressed by the compression circuit 68 and stored in the frame memory 70 after the data quantity is reduced.

As the information volume of image data is generally large, data compressing techniques for reducing the information volume by compressing the image data are employed for such imaging apparatus as digital still cameras when the image data is transferred to personal computers or preserved in external storage units. There is a JPEG (Joint Photographic Experts Group) algorithm, for example, which is an international standard encoding system for still color images as one of the aforementioned techniques.

Figure 6:
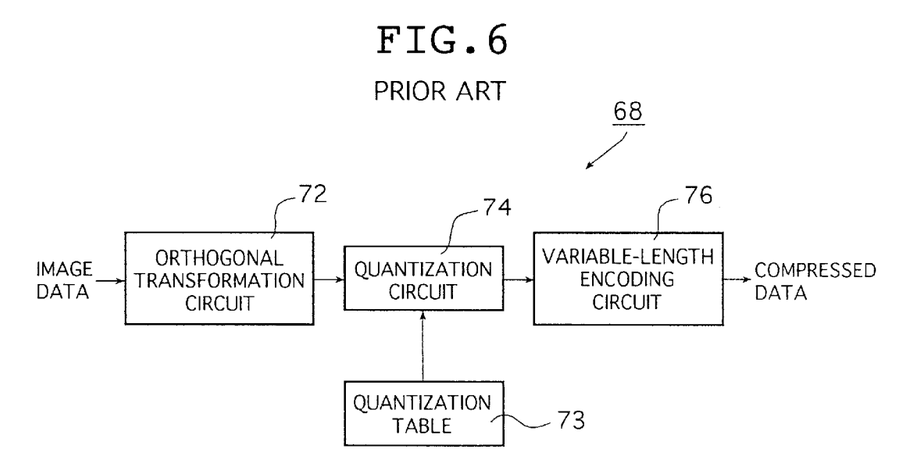
FIG. 6 is a block diagram showing a conventional compression circuit.

In the JPEG algorithm, encoding image data is sequentially carried out by, for example, dividing the image data into blocks of horizontal 8 pixels×vertical 8 pixels with a block as one unit. As shown in FIG. 6, in the compression circuit 68, each image data in each block is converted into coefficients of frequency components by an orthogonal transformation circuit 72, quantized by a quantization circuit 74 using a quantization table 73 and subjected by a variable-length encoding circuit 76 to variable-length encoding in order to make the image data a compressed data.

In the case of the aforesaid imaging apparatus 60, fixed image flaws such as white points or black points are produced in a regenerated image due to, for example, scratches on the lens 62, defective pixels of the imaging device 64 and furthermore dust sticking to the surfaces of the lens 62 and the imaging device 64. In order to deal with the fixed image flaws, there have heretofore been followed the steps of making an inspection when products are forwarded, replacing the lens 62 and the imaging device 64 whenever the product has not met predetermined standards and carrying out reassembly of the parts when dust is involved. In consequence, there have developed problems in that a yield rate is lowered and that the products tend to become costly.

An image flaw correcting method for correcting defective pixels of an imaging device as one of the means for solving the problems above described has heretofore been proposed in, for example, Japanese Patent Laid-Open Publication No. 6-105241/1994. This image flaw correcting method is intended to calculate a matrix of constants and a matrix of coefficients of equations corresponding to discrete cosine transformation based on the defective pixels of the imaging device, calculate a solution of the equations from an inverse matrix of these matrix of constants and matrix of coefficients, and correct the defective pixels based on this solution.

Furthermore, this image flaw correcting method is said to be able to put CCDs which are more defective than before into practice, and to realize an inexpensive camera system in this result. However, this image flaw correcting method is aimed to correct image data relevant to defective pixels of the imaging device and the problem is that it is incapable of dealing with image flaws of the regenerated image due to scratches on the lens and dust sticking to the surfaces of the lens and the imaging device.

SUMMARY OF THE INVENTION

An object of the present invention made in view of the foregoing problems with reference to the prior art is to provide an image correcting apparatus capable of correcting image flaws of a regenerated image due to scratches on a lens, defective pixels of an imaging device and furthermore dust sticking to the surfaces of the lens and the imaging device, an image data compressing apparatus using the image correcting apparatus, and an imaging apparatus fitted with the image correcting apparatus and the imaging data compressing apparatus.

In order to accomplish the above-described object, the present invention provides with an image correcting apparatus applied to a compression circuit for processing the compression of image data by subjecting the image data inputted on a block basis to orthogonal transformation, quantizing the image data according to a quantization table and subjecting the image data to variable-length encoding according to an encoding table, the image correcting apparatus comprising:

a switching circuit for switching a first quantization table for quantizing image data in a block where the image flaw exists and a second quantization table for quantizing image data in a block where the image flaw does not exist on a block basis according to flaw position information for indicating a position where the image flaw is located.

Preferably, an image correcting apparatus further comprises a flaw detecting circuit for comparing each coefficient after orthogonal transformation of image data of a single image with each reference coefficient after orthogonal transformation in order to detect whether or not the image flaw exists in the block and a data generating circuit for generating the first quantization table corresponding to the image flaw existing in the block detected by the flaw detecting circuit.

Preferably, the flaw detecting circuit also detects the flaw or block position information about the image flaw existing in the block detected.

Preferably, the data generating circuit also generates the flaw or block position information about the image flaw existing in the block detected by the flaw detecting circuit.

And also the present invention provides with an image data compressing apparatus comprising:

a compression circuit for processing the compression of image data, wherein the compression circuit comprises orthogonal transformation means for subjecting each image data inputted on a block basis to orthogonal transformation, quantizing means for quantizing the image data subjected to orthogonal transformation by the orthogonal transformation means according to quantization tables and an encoding circuit for subjecting the image data quantized by the quantizing means to variable-length encoding according to an encoding table and an image correcting apparatus comprising a switching circuit for switching a first quantization table for quantizing image data in a block where the image flaw exists and a second quantization table for quantizing image data in a block where the image flaw does not exist on a block basis according to flaw or block position information for indicating a position where the image flaw is located, the quantization tables being used in the quantizing means.

Preferably, the flaw or block position information is held in flaw-position-information holding means, wherein the flaw-position-information holding means applies to the switching circuit a signal for switching the quantization table referred to by the quantizing means from the second quantization table to the first quantization table when the image data quantized by the quantizing means in the block is the image data in the block where the image flaw exists.

Preferably, the first quantization table has at least two or more quantization tables corresponding to the image flaw; and the switching circuit switches at least two or more quantization tables corresponding to the image flaw.

Preferably, the second quantization table has at least two or more quantization tables corresponding to the resolution of the image data; and the switching circuit switches at least two or more quantization tables corresponding to the resolution of the image data.

Preferably, the first quantization table sets the numerical value of the quantizing coefficient of a high-frequency component greater than the numerical value of corresponding quantizing coefficient of a high-frequency component of the second quantization table.

Preferably, the switching circuit refers to the table listing the numerical value of the quantizing coefficient of a high-frequency component corresponding to the image flaw of a block where the image flaw exists or sets the numerical value of the quantizing coefficient of high-frequency component greater than the numerical value of corresponding quantizing coefficient of a high-frequency component of the second quantization table; and refers to the second quantization table in the position of a block where the image flaw does not exist, form and prepare the first quantization table and then supplies the first quantization table to a quantization circuit.

Preferably, the image correcting apparatus further comprises a flaw detecting circuit for comparing each coefficient of image data of a single image after orthogonal transformation by the orthogonal transformation means with each reference coefficient after orthogonal transformation in order to detect whether or not the image flaw exists in the block and a data generating circuit for generating the first quantization table corresponding to the image flaw existing in the block detected by the flaw detecting circuit.

Preferably, the flaw detecting circuit also detects the flaw or block position information about the image flaw existing in the block detected.

Preferably, the data generating circuit also generates the flaw or block position information about the image flaw existing in the block detected by the flaw detecting circuit.

Preferably, the flaw detecting circuit holds the reference coefficient after orthogonal transformation.

Preferably, the flaw detecting circuit employs coefficients after orthogonal transformation by the orthogonal transformation means of a block where the image flaw does not exist as the reference coefficients after orthogonal transformation.

Preferably, the flaw detecting circuit decides the presence of the image flaw when the difference between coefficients in a block where no image flaws exist and coefficients in a block where the image flaw exists is not less than a predetermined value.

Preferably, the predetermined value of the flaw detecting circuit is changeable.

Preferably, the flaw detecting circuit employs the coefficients of image data of at least one of the single white image and black one after orthogonal transformation by the orthogonal transformation means as the reference coefficients after orthogonal transformation, the coefficients having an AC component whose numerical value is '0'.

Preferably, the single image is at least one of the single white image and black one.

Preferably, the data generating circuit detects a block position where the image flaw is located as the flaw position information by counting the synchronizing signals of driving means for driving an imaging device in consideration of delay time when image data from the imaging device is divided on a block basis, wherein the imaging device generates the image data by subjecting the image to photoelectric conversion in order to obtain each image data inputted on a block basis.

Preferably, the data generating circuit detects a block position where the image flaw is located as the flaw position information from the address value of image data when the image data once held in a frame memory is read.

And also the present invention provides with an imaging apparatus comprising:

a lens for forming an image, an imaging device for subjecting the image passed through the lens to photoelectric conversion, a block conversion circuit for dividing image data outputted from the imaging device on a block basis, a compression circuit for processing the compression of image data, wherein the compression circuit comprises orthogonal transformation means for subjecting each image data inputted from the block conversion circuit on a block basis to orthogonal transformation, quantizing means for quantizing the image data subjected to orthogonal transformation by the orthogonal transformation means according to quantization tables and an encoding circuit for subjecting the image data quantized by the quantizing means to variable-length encoding according to an encoding table, and an image correcting apparatus comprising a switching circuit for switching a first quantization table for quantizing image data of a block where the image flaw exists and a second quantization table for quantizing image data of a block where the image flaw does not exist on a block basis according to flaw position information for indicating a position where the image flaw is located, the equalization tables being used in the quantizing means.

Preferably, the image correcting apparatus further comprises a flaw detecting circuit for comparing each coefficient of image data of a single image after orthogonal transformation by the orthogonal transformation means with each reference coefficient after orthogonal transformation in order to detect whether or not the image flaw exists in the block and a data generating circuit for generating the first quantization table corresponding to the image flaw existing in the block detected by the flaw detecting circuit.

Preferably, the flaw detecting circuit also detects the flaw or block position information about the image flaw existing in the block detected.

Preferably, the data generating circuit also generates the flaw or block position information about the image flaw existing in the block detected by the flaw detecting circuit.

DETAILED DESCRIPTION OF THE INVENTION

A detailed description will subsequently be given of an image correcting apparatus, an image data compressing apparatus using the image correcting apparatus and an imaging apparatus using the image correcting apparatus and the image data compressing apparatus of the present invention on the basis of the preferred embodiment of the present invention shown in the accompanied drawings.

Figure 1:
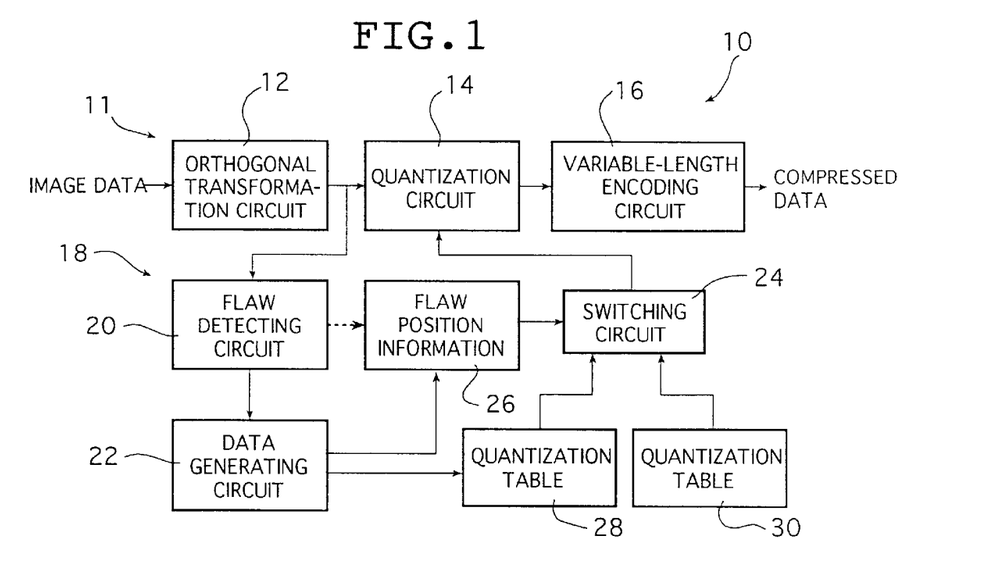
FIG. 1 is a block diagram showing the configuration of a data compressing apparatus as an embodiment of the present invention using an image correcting apparatus according to the present invention.

FIG. 1 is a block diagram showing the configuration of a data compressing apparatus as an embodiment of the present invention using an image correcting apparatus according to the present invention.

As shown in FIG. 1, an image data compressing apparatus 10 of the present invention comprises a compression circuit 11 and an image correcting apparatus 18 of the present invention.

The compression circuit 11 is applied to an imaging apparatus such as a digital still camera and used for dividing image data into blocks of horizontal 8 pixels×vertical 8 pixels and compressing image data of 64 pixels in a block through variable-length encoding with the image data equivalent thereto as one unit. The compression circuit 11 comprises an orthogonal transformation circuit 12, a quantization circuit 14 and a variable-length encoding circuit 16.

In the compression circuit 11, the orthogonal transformation circuit 12 first subjects each image data to orthogonal transformation such as DCT transformation (Discrete Cosine Transformation) on a block basis so as to convert image data into coefficients of frequency components.

The quantization circuit 14 quantizes each of the coefficients after orthogonal transformation outputted from the orthogonal transformation circuit 12 on a block basis according to a quantization table 28 or 30 outputted from the switching circuit 24 of the image correcting apparatus 18 of the present invention as will become apparent hereinafter.

Furthermore, the variable-length encoding circuit 16 subjects each of the coefficients after quantization outputted from the quantization circuit 14 according to an encoding table (not shown) to entropy encoding such as Huffman encoding or the like to have the coefficient so encoded by variable-length encoding as to provide compressed data on a block basis.

The compression circuit 11 is thus basically arranged. Incidentally, the specific arrangement of the compression circuit 11 is not limited to the example shown in FIG. 1.

Like the aforesaid compression circuit 11 and so on, the image correcting apparatus 18 of the present invention is applied to an imaging apparatus 40 (which will be described hereinafter) of the present invention, which imaging apparatus has the compression circuit for processing image data compression and is used for correcting image flaws of a regenerated image due to scratches on the lens of the imaging apparatus, defective pixels of an imaging device and furthermore dust sticking to the surfaces of the lens and the imaging device, the image correcting apparatus 18 essentially comprising a flaw detecting circuit 20, a data generating circuit 22 and a switching circuit 24.

In the image correcting apparatus 18, the flaw detecting circuit 20 compares each coefficient after orthogonal transformation of single image data with each reference coefficient after orthogonal transformation in order to detect whether or not any image flaw exists in the block.

In the imaging apparatus 40 (which will be described hereinafter) of the present invention fitted with the image data compressing apparatus 10 of the present invention to which the image correcting apparatus 18 of the present invention is applied, at least either single white image or black one is picked up. When an image flaw exists in the regenerated image at this time, a specific high-frequency component is included in the coefficient after orthogonal transformation.

Figure 2A:
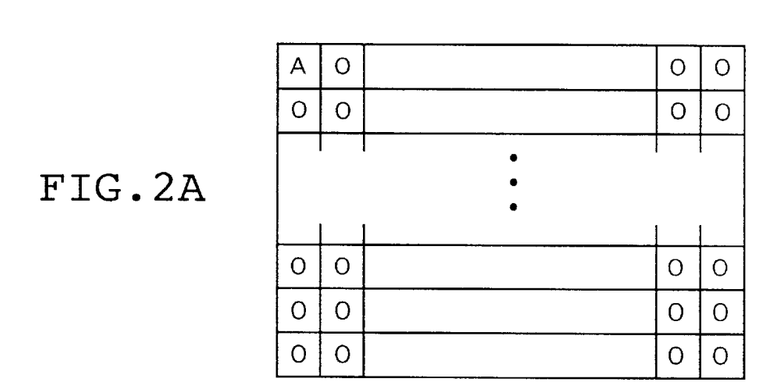
FIGS. 2A and 2B are conceptual drawings respectively showing coefficients after orthogonal transformation by way of example.
Figure 2B:
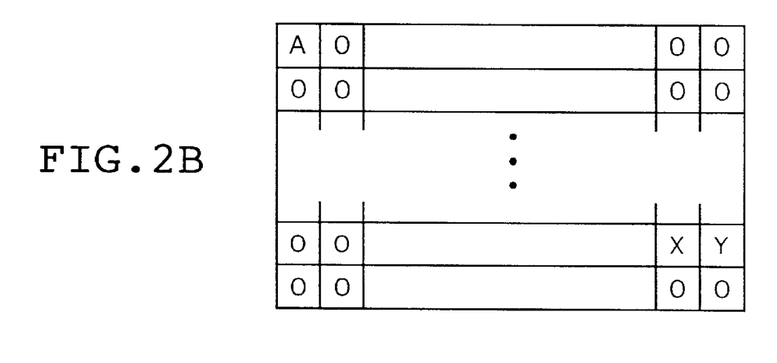

FIGS. 2A and 2B are conceptual drawings respectively showing coefficients after orthogonal transformation by way of example. FIG. 2A shows coefficients in a block where no flaws exist after orthogonal transformation, whereas FIG. 2B shows coefficients in a block where a flaw exists after orthogonal transformation. As shown in FIG. 2A, the coefficient in the block where no flaws exist after orthogonal transformation exhibits that the numerical value of a DC component (what is shown on the upper left-hand side in FIG. 2A) is not '0' but 'A' and the numerical value of any other AC component is totally '0'. As shown in FIG. 2B, on the contrary, a coefficient in a block where a flaw exists after orthogonal transformation exhibits that the numerical value of the DC component is similarly 'A' and numerical values other than '0' but 'X' and 'Y' exist on the high-frequency component side of the AC component. Based on this fact, the image correcting apparatus 18 of the present invention compares the coefficient in the block where no flaws exist after orthogonal transformation with the coefficient in the block where a flaw exists after orthogonal transformation on a corresponding coefficient-to-coefficient basis but when such a difference exists, the presence of a flaw is decided.

As there is a case where all of the numerical values of the AC components do not turn just '0' due to noise of an image processing circuit 44 (which will be described hereinafter) or where the numerical value becomes slightly different even in the block where no flaws exist, the presence of a flaw is decided when the difference between the coefficient in the block where no flaws exist after orthogonal transformation and the coefficient in the block where an existing flaw exceeds a predetermined value. Moreover, a criterion for judging where the flaw exists may be changed by changing the decided value.

Although the coefficient in the block where no flaws exist after orthogonal transformation is used as a reference according to this embodiment of the present invention, the invention is not limited to this embodiment thereof but may be applied to a case where what has an AC component whose numerical value is '0' as a reference coefficient after orthogonal transformation as aforesaid is used by photographing, for example, at least one of the single white image and black one or preferably both of them beforehand and confirming the coefficient after orthogonal transformation. It is also preferred for the flaw detecting circuit 20 to hold the reference coefficient after orthogonal transformation.

Furthermore, the data generating circuit 22 generates flaw position information 26 and the quantization table 28 when the presence of an image flaw within a block is detected by the flaw detecting circuit 20.

First, the flaw position information 26 refers to the block location of an image flaw existing in the regenerated image, that is, the location of a scratch on the lens of the imaging apparatus and that of a defective pixel of the imaging device, and the location of dirt and dust sticking to the surfaces of the lens and the imaging device.

Although the flaw position information 26 together with the quantization table 28 is generated in the data generating circuit 22 when the presence of the image flaw in the block is detected by the flaw detecting circuit 20 in the example above, the present invention is not limited to the example but may be applied to a case where the location of the image flaw is detected simultaneously when the presence of the image flaw in the block is detected by the flaw detecting circuit 20.

Figure 3A:
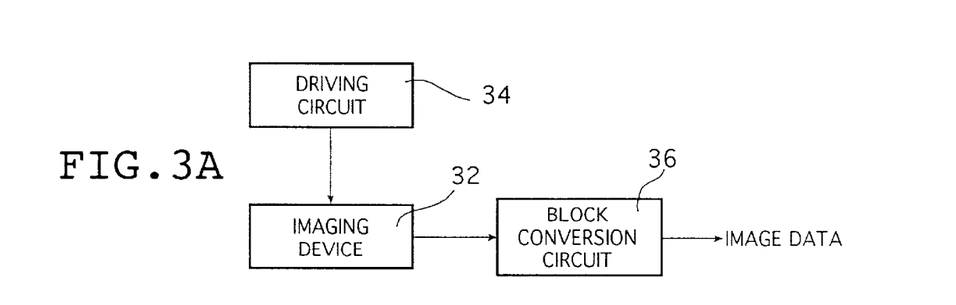
FIGS. 3A and 3B are block diagrams, each showing the configuration of an image data supply source as an embodiment of the present invention.
Figure 3B:
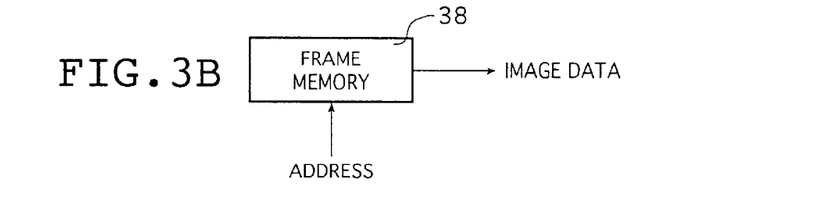

FIGS. 3A and 3B are block diagrams, each showing the configuration of an image data supply source as an embodiment of the present invention. FIG. 3A shows an example of the case where image data is inputted to the compression circuit 11 from an imaging device 32 via a block conversion circuit 36 in which the image data is divided on a block basis, whereas FIG. 3B shows an example of the case where image data is inputted to a compression circuit 11 from a frame memory 38 after the image data is held in the frame memory 38 once.

As shown in FIG. 3A, when the image data is fed from the imaging device 32, a block position where the image defect is located can be detected from conversion delay time in the block conversion circuit 36 by counting synchronizing signals which a driving circuit 34 for driving the imaging device 32 generates. As shown in FIG. 3B further, when the image data is fed from the frame memory 38, a block position where an image flaw is located can be specified from an address fed into the frame memory 38.

In these cases, the flaw position information 26 thus detected or specified by the flaw detecting circuit 20 or the data generating circuit 22 is preferably held in a flaw-position-information holding means.

On the other hand, the quantization table 28 is used for quantizing image data in the block where an image flaw exists; more specifically, the numerical value of the quantizing coefficient of a high-frequency component corresponding to the image flaw is increased so as to make inconspicuous the image flaw of the regenerated image and is provided in a manner corresponding to the block where an image flaw exists. Whereas the quantization table 30, like the quantization table 73 of the conventional compression circuit 68 shown in FIG. 6, is used for quantizing image data in the block where no image flaws exist and generally used in a block where no image flaws exist.

Although a reference has been made to the case where one quantization table 28 and one quantization table 30 are employed respectively according to this embodiment of the present invention by way of example, the invention is not limited to the example but may be applied to a case where, for example, two or more quantization tables 28 corresponding to the image flaws of the regenerated image or two or more of the quantization tables 30 corresponding to the resolution of the regenerated image in a standard or a high resolution mode are prepared, whereby to properly use these quantization tables 28, 30 by means of the switching circuit 24 for switching the quantization tables 28, 30.

Moreover, though the quantization table 28 and the quantization table 30 are provided independently beforehand, and these quantization tables 28, 30 are switched to use by the switching circuit 24 on a block basis, the present invention is not limited to this embodiment thereof but may be applied to a case where only a table for rendering only greater numerical values of quantizing coefficients of high- frequency components corresponding to image flaws relevant to the flaw position information is provided without preparing, for example, the quantization table 28 beforehand; in the switching circuit 24, with respect to the quantizing coefficients of high-frequency components corresponding to a block where an image flaw exists according to the flaw position information 26, greater numerical values in the relevant table are referred to; whereas with respect to quantizing coefficients corresponding to a block without any image flaw, the quantization table 28 is formed by referring to the quantization table 30, or the quantization table 28 entirely independent of the quantization table 30 is not provided beforehand; the numerical values of quantizing coefficients corresponding to the high-frequency components related to the image flaw out of the quantizing coefficients in the quantization table 30 are increased by the integral multiplication in order to form the quantization table 28 from the quantization table 30 in the switching circuit 24; and the quantization table 28 is thus prepared and used in the quantization circuit 14.

Subsequently, in the image correcting apparatus 18, the switching circuit 24 switches the quantization table 28 provided beforehand or formed and prepared and the quantization table 30 on a block basis according to the flaw position information 26 and supplies either one to the quantization circuit 14. More specifically, in this embodiment of the present invention, the quantization table 28 is selectively outputted from the switching circuit 24 to the block where an image flaw exists and the quantization table 30 is selectively outputted therefrom to the block where no image flaws exist.

Figure 4:
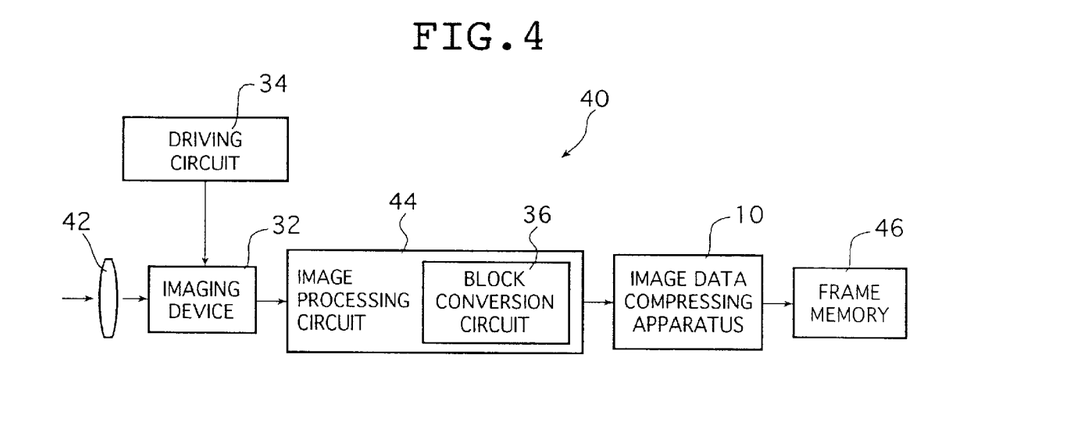
FIG. 4 is a block diagram showing an example of an imaging apparatus according to the present invention.

The imaging apparatus 40 of the present invention fitted with the image data compressing apparatus 10 of the present invention to which the image correcting apparatus 18 of the present invention and the compression circuit 11 are applied essentially comprises, as shown in a block diagram of FIG. 4, a lens 42, the imaging device 32, the driving circuit 34, an image processing circuit 44 including the block conversion circuit 36, the image data compressing apparatus 10 according to the present invention and a frame memory 46. The image formed through the lens 42 and inputted into the imaging device 32 such as CCD is subjected by the imaging device 32 to photoelectric conversion in order to make the image data, and then the image data is converted by the image processing circuit 44 into a format of such as RGB before being divided by the block conversion circuit 36 in the image processing circuit 44 into image data on a block basis, and furthermore the image data thus divided are inputted into the image data compressing apparatus 10 of the present invention.

In the image data compressing apparatus 10 of the present invention as aforesaid, each of the image data in each block is inputted into the compression circuit 11, then converted by the orthogonal transformation circuit 12 into coefficients of frequency components, further quantized by the quantization circuit 14 according to either quantization table 28 or quantization table 30 selectively outputted by the switching circuit 24 of the image correcting apparatus 18 of the present invention and ultimately subjected by the variable-length encoding circuit 16 to variable-length encoding according to the encoding table (not shown), so that compressed data is obtained.

In the imaging apparatus 40, on the other hand, an inspection is properly made to find image flaws when a product delivery inspection is made or when the products are actually used. When such an inspection is made to find image flaws, the presence or absence of an image flaw is detected by the flaw detecting circuit 20 of the image correcting apparatus 18 of the present invention by picking up at least one of the single white image and black one. When the presence of an image flaw is detected thereby, the flaw position information 26 and the quantization table 28 corresponding to the block in which the image flaw exists are generated by the data generating circuit 22.

The flaw position information 26 and the quantization table 28 are both held in the imaging apparatus 40. Since the flaw position information 26 and the quantization table 28 can properly be updated accordingly in the imaging apparatus 40 to which the image data compressing apparatus 10 with the image correcting apparatus 18 of the present invention is applied, it is possible to correct the image flaws produced in the regenerated image due to scratches on the lens, defective pixels of the imaging device and furthermore dust sticking to the surfaces of the lens and the imaging device in the case where the image flaws are produced after products are shipped.

When actual use is made of the imaging apparatus 40 of the present invention to which the image data compressing apparatus 10 with the image correcting apparatus 18 of the present invention is applied as aforesaid, each of the image data in each block is first converted by the orthogonal transformation circuit 12 into coefficients of frequency components, then quantized by the quantization circuit 14 according to either quantization table 28 or quantization table 30 selectively outputted by the switching circuit 24 and ultimately subjected by the variable-length encoding circuit 16 to variable-length encoding according to the encoding table (not shown), so that the compressed data is obtained.

In the imaging apparatus 40 to which the image data compressing apparatus 10 with the image correcting apparatus 18 of the present invention and the compression circuit 11 are applied in this case, image data in a position block where an image flaw exists is quantized according to the quantization table 28 and image data in a block where no image flaws exist is quantized according to the quantization table 30 according to the flaw position information 26, whereby the image data in the block where the image flaw exists is so corrected as to make the image flaw of the regenerated image inconspicuous.

In the image correcting apparatus 18 of the present invention, the image data compressing apparatus 10 of the present invention having the image correcting apparatus 18, and the imaging apparatus 40 of the present invention fitted with the image data compressing apparatus 10, it is possible to correct the image flaws produced in the regenerated image due to scratches on the lens, defective pixels of the imaging device and furthermore dust sticking to the surfaces of the lens and the imaging device in a manner making the image flaws inconspicuous. Even in the case where scratches on the lens and defective pixels of the imaging device exist, the necessity of replacing the lens and the imaging device is lessened and even in the case where the image flaw due to dust sticking thereto exists, reassembly work can be dispensed with; thus, cost can be curtailed in either case.

The image correcting apparatus 18, the image data compressing apparatus 10 of the present invention to which the image correcting apparatus 18 is applied and the imaging apparatus 40 of the present invention fitted with the image data compressing apparatus 10 are basically configured as aforesaid.

Although there has been shown the case where the flaw detecting circuit 20, the data generating circuit 22 and the switching circuit 24 are integrally formed so as to constitute the image correcting apparatus 18 inside the image data compressing apparatus 10 and the imaging apparatus 40, the present invention is not limited to the above case but may be applicable to a case where, for example, the flaw detecting circuit 20 and the data generating circuit 22 are provided outside the image data compressing apparatus 10 and the imaging apparatus 40 as a separate type. The separate type like this is preferred because each of the image data compressing apparatus 10 and the imaging apparatus 40 as single product bodies can be held down in price.

As set forth above in detail, the image correcting apparatus, the image data compressing apparatus using the image correcting apparatus, and the imaging apparatus using the image correcting apparatus and the image data compressing apparatus of the present invention are adapted to quantize each coefficient after orthogonal transformation by switching a first quantization table for quantizing the image data in the block where the image flaw exists and a second quantization table for quantizing the image data in the block where no image flaws exist and vice versa exists on a block basis according to the flaw position information for indicating the position where the image flaw is located.

In the image correcting apparatus, the image data compressing apparatus using the image correcting apparatus, and the imaging apparatus using the image correcting apparatus and the image data compressing apparatus according to the present invention, the image flaws of the regenerated image due to scratches on the lens of the imaging apparatus and defective pixels of the imaging device are corrected in a manner making the image flaws inconspicuous. In the image correcting apparatus, the image data compressing apparatus using the image correcting apparatus, and the imaging apparatus using the image correcting apparatus and the image data compressing apparatus according to the present invention, the image flaws of the regenerated image due to scratches on the lens and defective pixels of the imaging apparatus at the time of actual use and furthermore dust sticking to the surfaces of the lens and imaging device can be corrected whenever necessary by providing the flaw detecting circuit and the data generating circuit integrally with or separately from the imaging apparatus.

Thus, by the use of the image correcting apparatus, the image data compressing apparatus using the image correcting apparatus, and the imaging apparatus using the image correcting apparatus and the image data compressing apparatus according to the present invention, the necessity of replacing component parts is lessened even when scratches on the lens of the imaging apparatus and the defective pixels of the imaging device exist and a yield rate becomes improvable and furthermore even in the case where the dust sticks to the surfaces of the lens and the imaging device, the necessity of doing reassembly work is also lessened; thus, cost can be curtailed in either case.

A detailed description has been given of the image correcting apparatus, the image data compressing apparatus using the image correcting apparatus, and the imaging apparatus using the image correcting apparatus and the image data compressing apparatus. However, the present invention is not limited to the aforesaid embodiment thereof but may needless to say be modified and changed in various manners without departing from the spirit and scope of the invention.

What is claimed is:

1. An image correcting apparatus applied to a compression circuit for processing the compression of image data by subjecting the image data inputted on a block basis to orthogonal transformation, quantizing the image data according to a quantization table and subjecting the image data to variable-length encoding according to an encoding table, the image correcting apparatus comprising:

a switching circuit for switching a first quantization table for quantizing image data in a block where the image flaw exists and a second quantization table for quantizing image data in a block where the image flaw does not exist on a block basis according to flaw position information for indicating a block position where the image flaw is located, a flaw detecting circuit for comparing each coefficient after orthogonal transformation of image data of a single image with each reference coefficient after orthogonal transformation in order to detect whether or not the image flaw exists in the block.

2. An image correcting apparatus as claimed in claim 1, further comprising:

a data generating circuit for generating the first quantization table corresponding to the image flaw existing in the block detected by the flaw detecting circuit.

3. An image correcting apparatus as claimed in claim 2, wherein the flaw detecting circuit also detects the block position information about the image flaw existing in the block detected.

4. An image correcting apparatus as claimed in claim 2, wherein the data generating circuit also generates the block position information about the image flaw existing in the block detected by the flaw detecting circuit.

5. An image data compressing apparatus comprising:

a compression circuit for processing the compression of image data, wherein the compression circuit comprises orthogonal transformation means for subjecting each image data inputted on a block basis to orthogonal transformation, quantizing means for quantizing the image data subjected to orthogonal transformation by the orthogonal transformation means according to quantization tables and an encoding circuit for subjecting the image data quantized by the quantizing means to variable-length encoding according to an encoding table and an image correcting apparatus comprising a switching circuit for switching a first quantization table for quantizing image data in a block where the image flaw exists and a second quantization table for quantizing image data in a block where the image flaw does not exist on a block basis according to flaw position information for indicating a position where the image flaw is located, the quantization tables being used in the quantizing means.

6. An image data compressing apparatus as claimed in claim 5, wherein the block position information is held in flaw-position-information holding means, wherein the flaw-position-information holding means applies to the switching circuit a signal for switching the quantization table referred to by the quantizing means from the second quantization table to the first quantization table when the image data quantized by the quantizing means in the block is the image data in the block where the image flaw exists.

7. An image data compressing apparatus as claimed in claim 5, wherein the first quantization table has at least two or more quantization tables corresponding to the image flaw; and the switching circuit switches at least two or more quantization tables corresponding to the image flaw.

8. An image data compressing apparatus as claimed in claim 5, wherein the second quantization table has at least two or more quantization tables corresponding to the resolution of the image data; and the switching circuit switches at least two or more quantization tables corresponding to the resolution of the image data.

9. An image data compressing apparatus as claimed in claim 5, wherein the first quantization table sets the numerical value of the quantizing coefficient of a high-frequency component corresponding to the position of the image flaw greater than the numerical value of corresponding quantizing coefficient of a high-frequency component of the second quantization table.

10. An image data compressing apparatus as claimed in claim 5, wherein the switching circuit refers to the table listing the numerical value of the quantizing coefficient of a high-frequency component corresponding to the image flaw in the position of a block where the image flaw exists or sets the numerical value of the quantizing coefficient of high-frequency component corresponding to the position of the image flaw greater than the numerical value of corresponding quantizing coefficient of a high-frequency component of the second quantization table; and refers to the second quantization table in the position of a block where the image flaw does not exist, form and prepare the first quantization table and then supplies the first quantization table to a quantization circuit.

11. An image data compressing apparatus as claimed in claim 5, wherein the image correcting apparatus further comprising a flaw detecting circuit for comparing each coefficient of image data of a single image after orthogonal transformation by the orthogonal transformation means with each reference coefficient after orthogonal transformation in order to detect whether or not the image flaw exists in the block and a data generating circuit for generating the first quantization table corresponding to the image flaw existing in the block detected by the flaw detecting circuit.

12. An image data compressing apparatus as claimed in claim 11, wherein the flaw detecting circuit also detects the block position information about the image flaw existing in the block detected.

13. An image data compressing apparatus as claimed in claim 11, wherein the data generating circuit also generates the block position information about the image flaw existing in the block detected by the flaw detecting circuit.

14. An image data compressing apparatus as claimed in claim 11, wherein the flaw detecting circuit holds the reference coefficient after orthogonal transformation.

15. An image data compressing apparatus as claimed in claim 11, wherein the flaw detecting circuit employs coefficients after orthogonal transformation by the orthogonal transformation means in a block where the image flaw does not exist as the reference coefficients after orthogonal transformation.

16. An image data compressing apparatus as claimed in claim 15, wherein the flaw detecting circuit decides the presence of the image flaw when the difference between coefficients in a block where no image flaws exist and coefficients in a block where the image flaw exists is not less than a predetermined value.

17. An image data compressing apparatus as claimed in claim 16, wherein the predetermined value of the flaw detecting circuit is changeable.

18. An image data compressing apparatus as claimed in claim 16, wherein the flaw detecting circuit employs the coefficients of image data of at least one of the single white image and black one after orthogonal transformation by the orthogonal transformation means as the reference coefficients after orthogonal transformation, the coefficients having an AC component whose numerical value is '0'.

19. An image data compressing apparatus as claimed in claim 11, wherein the single image is at least one of the single white image and black one.

20. An image data compressing apparatus as claimed in claim 11, wherein the data generating circuit detects a position where the image flaw is located as the flaw position information by counting the synchronizing signals of driving means for driving an imaging device in consideration of delay time when image data from the imaging device is divided on a block basis, wherein the imaging device generates the image data by subjecting the image to photoelectric conversion in order to obtain each image data inputted on a block basis.

21. An image data compressing apparatus as claimed in claim 11, wherein the data generating circuit detects a position where the image flaw is located as the block position information from the address value of image data when the image data once held in a frame memory is read.

22. An imaging apparatus comprising:

a lens for forming an image, an imaging device for subjecting the image passed through the lens to photoelectric conversion, a block conversion circuit for dividing image data outputted from the imaging device on a block basis, a compression circuit for processing the compression of image data, wherein the compression circuit comprises orthogonal transformation means for subjecting each image data inputted from the block conversion circuit on a block basis to orthogonal transformation, quantizing means for quantizing the image data subjected to orthogonal transformation by the orthogonal transformation means according to quantization tables and an encoding circuit for subjecting the image data quantized by the quantizing means to variable-length encoding according to an encoding table, and an image correcting apparatus comprising a switching circuit for switching a first quantization table for quantizing image data in a block where the image flaw exists and a second quantization table for quantizing image data in a block where the image flaw does not exist on a block basis according to block position information for indicating a position where the image flaw is located, as the quantization tables being used in the quantizing means.

23. An imaging apparatus as claimed in claim 22, wherein the image correcting apparatus further comprising a flaw detecting circuit for comparing each coefficient of image data of a single image after orthogonal transformation by the orthogonal transformation means with each reference coefficient after orthogonal transformation in order to detect whether or not the image flaw exists in the block and a data generating circuit for generating the first quantization table corresponding to the image flaw existing in the block detected by the flaw detecting circuit.

24. An imaging apparatus as claimed in claim 23, wherein the flaw detecting circuit also detects the block position information about the image flaw existing in the block detected.

25. An imaging apparatus as claimed in claim 23, wherein the data generating circuit also generates the block position information about the image flaw existing in the block detected by the flaw detecting circuit.

* * * * *